INVENTORS:
Henri Breton & René Breton
By Attys.
Fraser, Jenks & Meyers

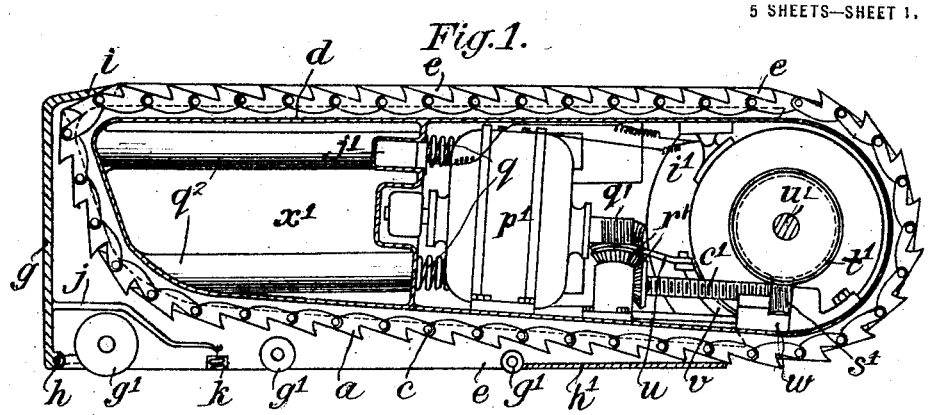
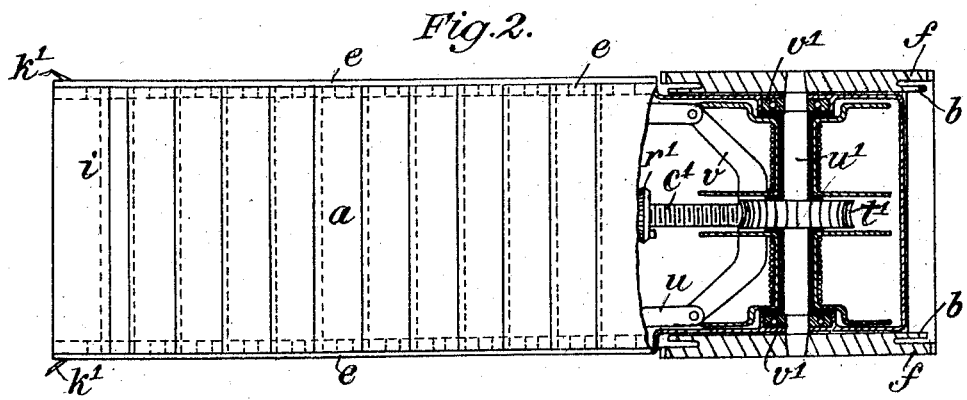
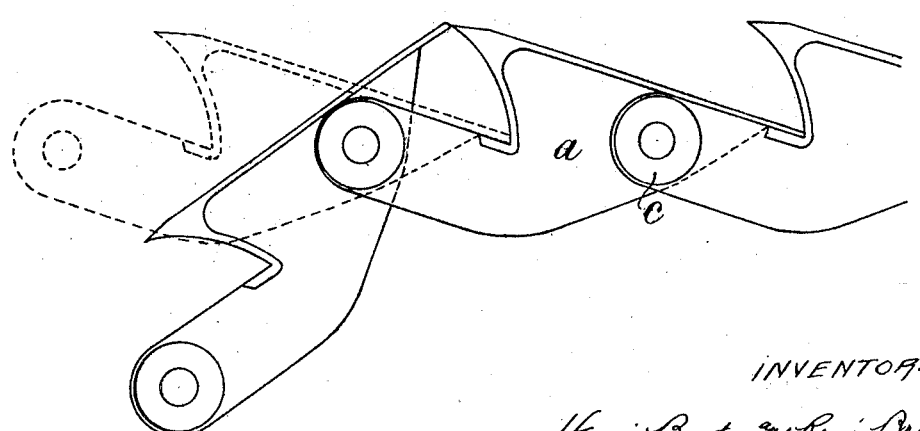

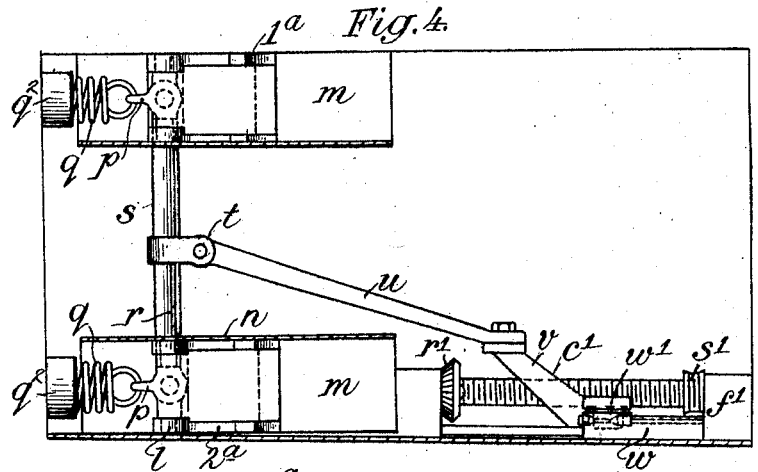
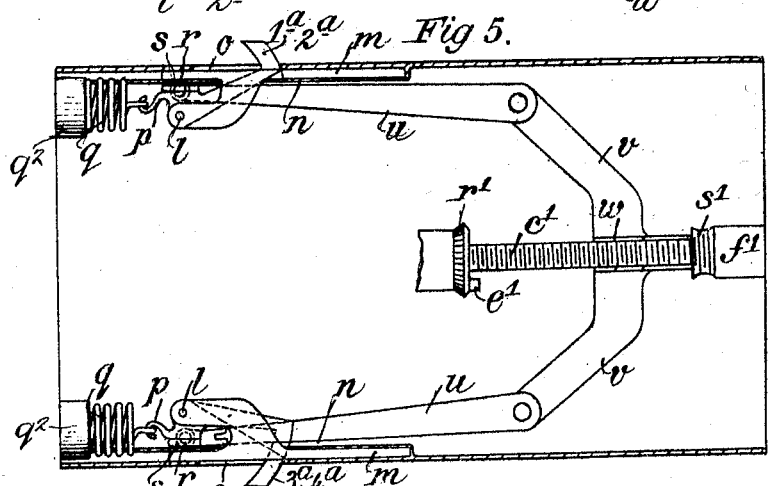
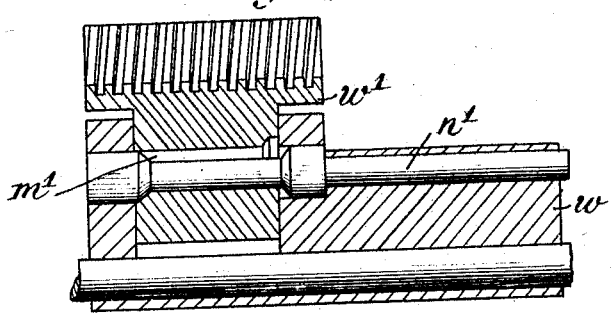

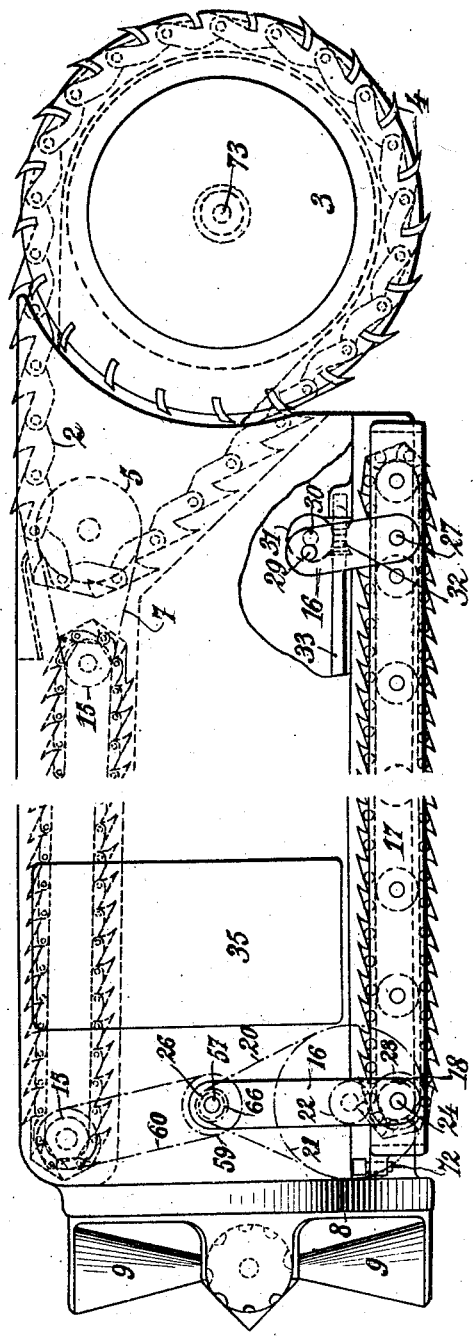
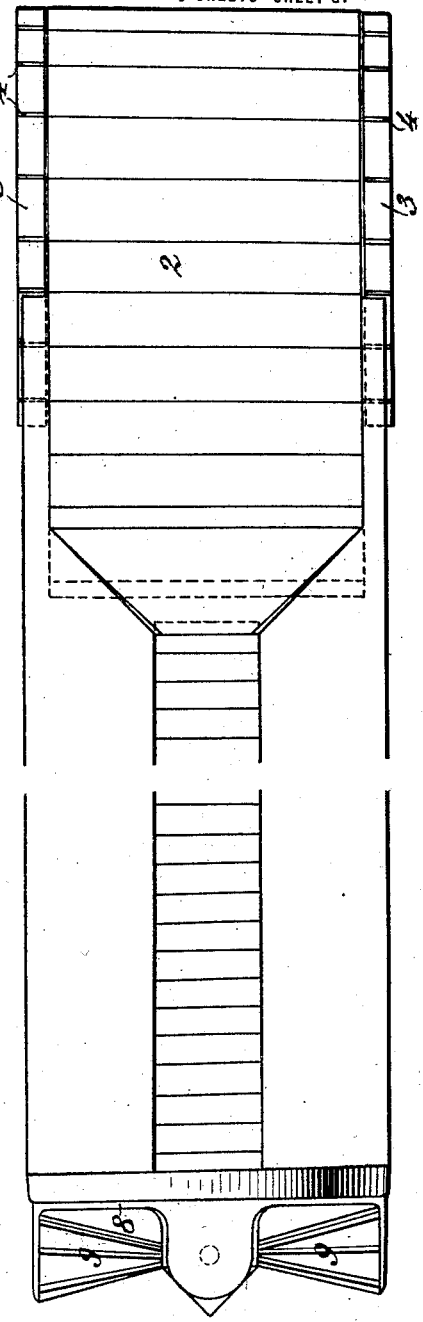

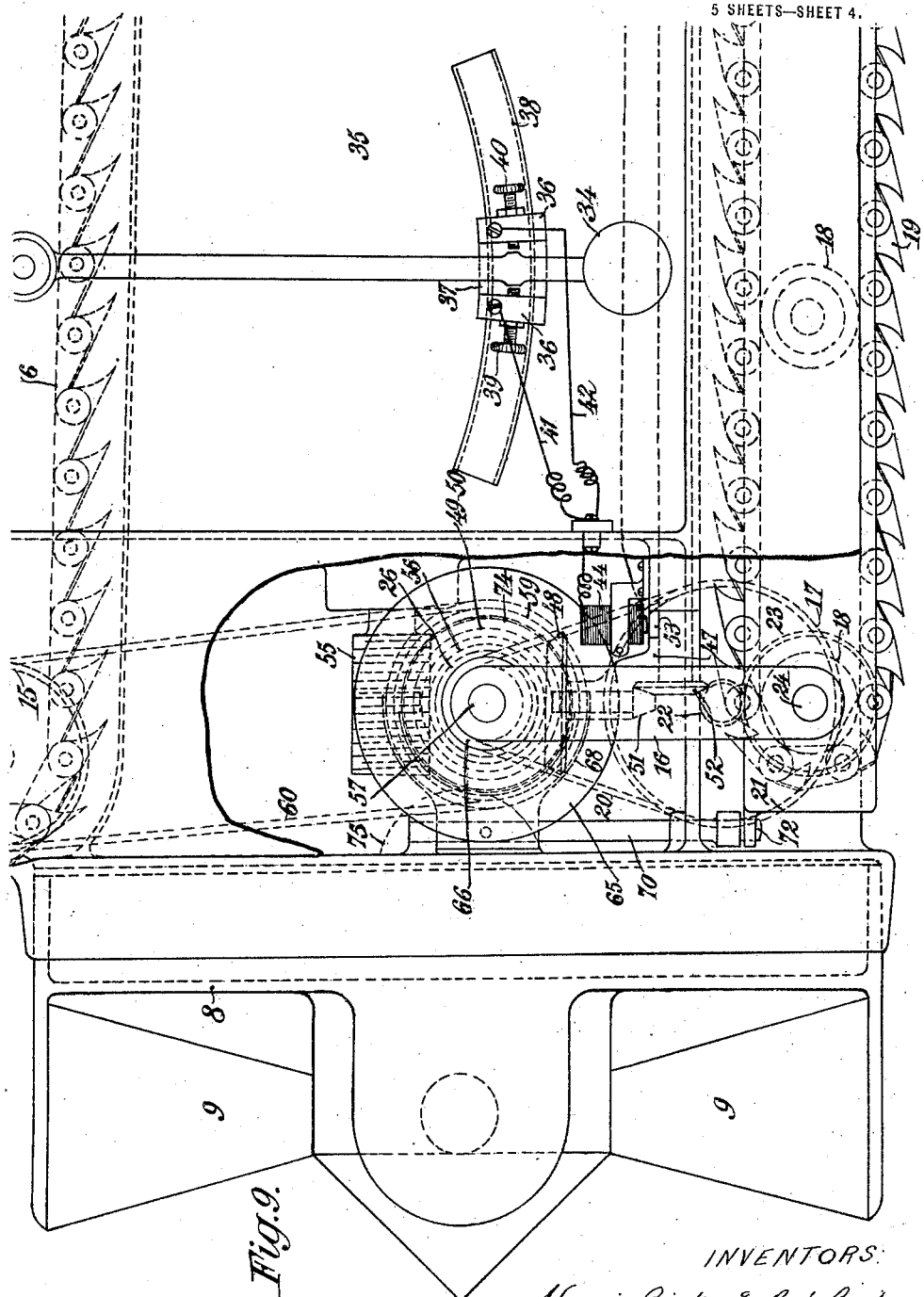

UNITED STATES PATENT OFFICE.

HENRI BRETON AND RENÉ BRETON, OF PARIS, FRANCE.

UNDERGROUND AUTOMOTIVE ENGINE.

1,408,720.     Specification of Letters Patent.     Patented Mar. 7, 1922.

Application filed November 14, 1917. Serial No. 202,078.

*To all whom it may concern:*

Be it known that we, HENRI BRETON and RENÉ BRETON, citizens of the Republic of France, residing in Paris, France, have invented certain new and useful Improvements in Underground Automotive Engines, of which the following is a specification.

The object of the present invention is an automobile engine, which may be charged with explosive material, adapted to move under ground by its own means a predetermined distance in the required direction and at the desired depth. When it has arrived at the end of its travel the subterranean engine automatically stops and signals its arrival. Its explosive charge can then be exploded by one or more explosions at the desired moment.

The travel of the subterranean torpedo is as silent as possible so that nothing should signal to the enemy the approach of one or more of these machines.

The machine has usually a maximum range of 1000 metres, but this can be increased.

A construction of subterranean torpedo according to the invention is shown in the accompanying Figs. 1–10 which represent, respectively:

Fig. 1, a sectional elevation through the longitudinal axis of the torpedo;

Fig. 2, a plan partly in section;

Fig. 3, shows on a larger scale the cutting tools secured to an endless chain;

Figs. 4 and 5 show, respectively, in elevation and plan details of the actuating mechanism of the grapnels for advancing the torpedo;

Fig. 6 shows a detail of Fig. 4 on a larger scale;

Figure 10:
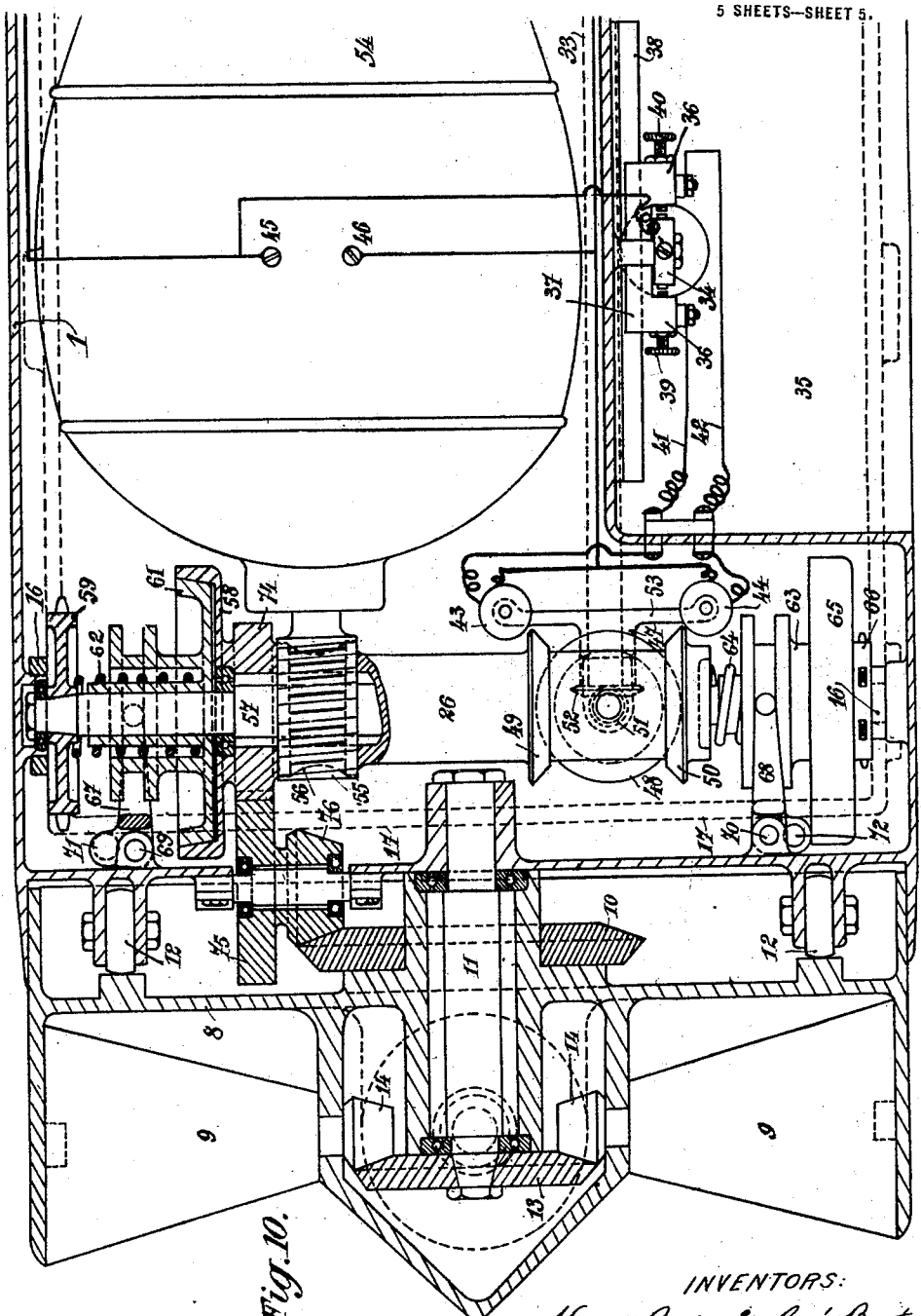

Figs. 7, 8, 9 and 10 relate to a modification of the construction of the torpedo.

Figs. 7 and 8 show, respectively, in side elevation and in plan the improved torpedo;

Fig. 9 is a side elevation on a larger scale of the rear part, the casing having been partly removed;

Fig. 10 is a horizontal section centrally of Fig. 9.

Referring to Figs. 1–6, the excavating members consist of a series of cutting tools secured to an endless chain $a$ passing over two toothed driving wheels $b$ disposed on each side at the front of the torpedo.

These cutting tools are formed of the shape shown and occupy nearly all the width of the machine (Fig. 2); they carry hardened steel blades adapted to cut the hardest materials.

On leaving the toothed wheels $b$, the chain, which is provided on each side with pin joints $c$, passes over a guide casing $d$.

This casing guides the chain by the upper and external part of the machine to the rear, and returns in an oblique direction under the machine to the toothed wheels $b$.

Laterally, the chain passes between two cheeks or side walls $e$ which serve to protect the pins $c$ and to prevent them from fouling.

On the external side of each toothed wheel $b$ is an integral extension, in the form of a plate $f$ provided with hardened steel blades adapted to cut a passage for the cheeks $e$.

At the rear of the machine is a movable back plate $g$ hinged at $h$ having a knife edge $i$ which rubs constantly on the chain $a$ and is maintained in this position by means of two arms $j$ and springs $k$.

For the propulsion of the torpedo, grappling irons $1^a$, $2^a$, $3^a$, $4^a$ are arranged at the top and bottom of the two sides.

The irons, pivoted at $l$, are each mounted on a steel slide block $m$ which moves in a slideway $n$.

The grappling irons project through apertures $o$ provided in the wall $e$. They are provided with arms $p$ to which are hooked springs $q$. Each spring is disposed in a tube $q^2$ (Fig. 1) passing to the rear extremity of the torpedo.

On each arm $p$ is pivoted a rod $r$ enclosed in a tube $s$, so that the rods can turn relatively to one another.

The tube $s$ carries a collar having a lug $t$ in which is pivoted a rod $u$, the other end of which is connected to a sliding block $w$, comprising a half nut $w^1$ provided with two arms $v$. A rod $n^1$ is adapted to slide in a longitudinal aperture in the block $w$ and, according as it is pulled in the one or other direction, raises or lowers the half nut $w^1$ which is threaded to engage with a screw $c^1$.

The screw $c^1$ has a continuous rotary movement which is communicated to it by a motor $p^1$ through a beveled pinion $r^1$. The external face of this pinion carries a projection $e^1$ with inclined faces which will push the rod $n^1$ towards the right when the block $w$ has been brought to $r^1$ by the springs $q$. The rod $n^1$ when brought to abut against the support $f^1$ is displaced towards the left (Fig. 6) and lowers the nut $w^1$ which disengages from the screw $c^1$.

In Fig. 6 the nut $w^1$ is shown in its uppermost position. The rod $n'$ actuates the nut $w^1$ by means of the two oppositely disposed beveled or inclined faces, one of which has just elevated the nut $w^1$ to the position shown in Fig. 6. When the right hand end of the rod $n^1$ engages the support $f^1$ as in Fig. 4, the rod is moved to the left and the nut $w^1$ is permitted to drop to its lowermost position. When the plug $w$ reaches the other limit of its movement, the left hand end of the rod $n^1$ engages the projection $e^1$ during the rotation of the latter and is actuated thereby to the right, again forcing the nut $w^1$ upwardly to the position shown in Fig. 6.

The entire system is thus freed and the springs $q$ can exert their tractive force. This produces at first a rotation of the grappling irons $1^a$, $2^a$, $3^a$, $4^a$ about their axes, causing them to penetrate into the soil.

As each grappling iron is independently pivoted it can accommodate itself to the nature of the ground which it encounters. When the half nut $w^1$ has again engaged with the screw $c^1$, the pull exerted on the arm $p$ disengages the grapplings which are withdrawn within the casing.

In this movement the springs $q$ are stretched until the half nut $w^1$ is again disengaged from $c^1$ and the advance above described recommences.

The front part of the machine rests on a plate $h^1$ which serves as a guide; at the rear it rolls on rollers $q^1$. The electric motor $p^1$, rotating at about 1200 revolutions per minute, placed in the centre of the torpedo, drives by a worm $q^1$ bevel pinions $r^1$ and the screw $c^1$, a worm $s^1$ on which drives a worm wheel $t^1$.

The wheel $t^1$ is keyed on a shaft $u^1$ which may be provided with a stuffing box which enables the advance to be effected even in a very wet district. It turns on two ball bearings $v^1$ and carries on its ends toothed wheels $b$ and cutting plates $f$ which rotate at the rate of about one revolution per minute.

On each side of the toothed wheel $t^1$ are arranged two bobbins or reels insulated from the shaft and from the side walls.

On each of these bobbins which are loose on their axes is wound an insulated electric lead, the length of which on one bobbin corresponds exactly to the distance which it is required to send the torpedo. On the other bobbin several metres more of the lead are wound.

One end of each lead is connected to the bobbin on which it is wound, the other end passing by a tube in either side wall to the rear of the torpedo at $k^1$.

On each side of the bobbins an insulated spring brush $i^1$ makes contact. This brush is connected to a terminal of the motor. The lead which is connected to the bobbin having the greatest length of wire is connected at the other end to a terminal of an electric detonator $j^1$.

The action is as follows:—The length of lead being regulated according to the distance to be reached, a hole in the ground is dug of the size of the machine and the torpedo is placed in it pointing exactly in the required direction. The hole is filled up, the earth being rammed particularly against the sides and rear of the machine. The current is then turned on to the electric motor $p^1$ which is set in motion, driving the endless chain, of which the cutting tools remove the earth from in front towards the rear of the torpedo.

Each blade as it inclines drives the earth from the following cutter and heaps it at the rear of the machine, where the movable back plate $g$ forms a fulcrum, thus helping at each passage of the blade or link by its movement from front to rear, the travel of the machine.

During this work of excavation, the grapnels $1^a$, $2^a$, $3^a$, $4^a$ fix themselves in the walls and advance the knives.

This advance takes place according to the nature and hardness of the soil, since the springs $q$ control it.

The electric leads which energize the motor in accordance with the advance of the machine are unwound and are embedded in the material placed at the rear of the torpedo.

When the shortest of the two cables is unwound from its bobbin, the machine being at the end of its travel, this cable breaks at a predetermined point.

The current at this instant is interrupted and the ammeter, for example, will give notice of the arrival of the torpedo at its goal.

The other cable, the longer one, will still be attached to its bobbin and by the plug $j^1$ to the terminal of the electric detonator. A current can be sent at the required moment by this cable which will produce the explosion of the charge placed in $x^1$.

The construction shown in Figs. 7–10 shows modifications intended to improve the propulsion, excavation and evacuation of the material, to ensure a more effective piling of the excavated material at the rear of the torpedo and to ensure that the required inclination to the horizontal is automatically maintained.

In the modification the torpedo consists of an envelope or box 1 of parallelepiped form made of sheet and cast steel or of any other suitable material containing and forming a frame for the different mechanical members. As in the preceding example, on the upper forward part of this box are disposed the cutting devices and at its rear part the arrangements for depositing the material.

The excavating arrangement consists of a chain with automatic disengagement, of which the construction and functions have been described above. As in the former example, this chain 2 provided in the box 1, has plates 3. on each side thereof and cutting blades 4 slightly projecting in relation to the sides or cheeks of the box in order to ensure a sufficiently wide passage for the torpedo. The internal face of each of these plates has a toothed wheel engaging with the endless excavating chain 2 supported and driven by a driving drum 5.

At the upper central part of the torpedo there is another endless chain 6 guided by drums 15 similar to chain 2 but smaller. The object of this second chain is to rapidly transport to the rear the disintegrated materials which are thrown on it by means of an inclined plane by the chain 2 on its passage over the drum 5. The drum 5 is driven by one of the drums 15 of the evacuating chain 6 by a transmission chain 7.

The arrangement for piling up the material excavated in this way comprises a circular plate 8 forming the rear part of the torpedo, to which a continuous rotation about its axis is imparted. On this plate are disposed crosswise four similar cones 9, rotated by the plate 8 and also having a movement of rotation about their own axes. These cones are driven at a speed equal to that which they would have if they rolled without sliding on a supplementary conical surface under the action of the plate 8.

By the simultaneous action of these cones a suitable disposition of the broken up material is obtained which prevents any choking of the excavating and evacuating members and consequently any premature arrest of the torpedo.

Two of the cones 9 may be and preferably are channeled for the purpose of breaking up the clods of earth or stones, in order to expedite the piling up.

The plate 8 carries a bevel wheel 10 by which it is driven and turns on a fixed shaft 11 on which it is mounted by ball bearings. It is also supported against the reaction of the heaped up material by rollers 12 carried by the back plate of the torpedo.

The cones 9 are driven by means of a fixed bevel wheel 13 keyed to the shaft 11 and gearing with planet pinions 14 which are integral with the cones 9.

At its lower part the torpedo rests by means of four rods 16 on a frame 17 carrying drums 18 over which an endless chain 19 passes. This chain occupies nearly all the width of the torpedo and is similar to the chain 6.

The points of this chain, by reason of the weight of the machine, penetrate into the soil which has just been excavated and acting like grapnels form fulcrums which ensure the progression of the torpedo. As the chain is disengaged from the soil, since, unlike the preceding, it is not automatically unclutched, it prevents even in soft ground any accumulation of material between the links which might give rise to sudden stoppages.

The chain 19 is driven by means of a transmission chain 20 through a toothed wheel 21 and a pinion 22 gearing with another toothed wheel 23 which is integral with the driving drum 18.

The two rear rods 16 are pivoted at 24 on the frame 17 and on a secondary driving shaft 57. The two forward rods 16 are pivoted at 27 on the frame and on pins 29 carried by a shaft 30. At the middle of this shaft a worm wheel 31 is secured which engages with a worm 32 forming one of the extremities of a longitudinal shaft 33, terminating at the other end at a principal shaft 26 to which it is connected by a clutch arrangement placed under the control of a pendulum 34, with the object of automatically ensuring the maintenance of the correct depth, as will be explained later.

The pendulum 34, electrically insulated and connected to one of the terminals 45 of the electric motor, is placed in an interior compartment 35 of the box 1. It can move between two arms 36 of a slide block 37, which latter is controlled relatively to a fixed graduated sector 38 acting as a slide. Each of the arms 36 carries an adjustable platinized screw 39. 40 which always leaves a certain play between itself and the pendulum. Each of these platinized screws is insulated from the slide block and is connected by a lead 41, 42 to one of two electromagnets 43 or 44 which are connected to another terminal 46 of the motor.

The electromagnets 43, 44 can rotate in the one or other direction a sleeve 47 on the shaft 33 by their action on a lever with two soft iron arms integral with the sleeve 47. These movements bring a pinion 48 carried by the member 47 into engagement either with a pinion 49 or with a pinion 50, both of which are continuously rotated by the shaft 26 on which they are keyed. The pinion 48, by means of another pinion 51 carried by the same shaft, determines the rotation in the one or other direction of a third pinion 52 keyed to the extremity of the shaft 33. Normally, under the influence of a spring 64 (Fig. 10), the sleeve 47 occupies a mean position in which the lever with the two arms 53 is horizontal and the pinion 48 is not in gear with either of the pinions 49 or 50.

The principal shaft 26 which drives these devices is driven itself by an electric motor 54 through a worm 55 and a worm wheel 56. The shaft 26 consists of a tubular part turning with the aid of ball bearings on a secondary shaft 57. It carries besides the worm wheel 56 at one end the female part 58 of a clutch and a toothed wheel 74, and at its other end the two bevel wheels 49 and 50.

The secondary shaft 57 is also mounted in ball bearings in the frame 1. At one end there is keyed to it a toothed wheel 59, driving through a chain 60 the evacuating and excavating members, and the male part 61 of the clutch which was mentioned above mounted so as to be able to slide freely without turning. This male part is constantly urged into engagement with the female part 58 by a spring 62. At the other end of the shaft 51 is mounted similarly a male part 63 urged by a spring 64 of a clutch similar to that which is just mentioned, of which the female part 65 is mounted loose on the same shaft and carries externally a toothed wheel 66 driving the transmission chain 20.

Each male part 61 and 63 of the two clutches has a hub with a circular groove in which pins on the end of a fork 67 or 68 engage. Each of these forks is fixed on the upper part of a shaft 69 or 70 which turns freely in mountings suitably disposed on the back of the box 1. These shafts 69 and 70 terminate at their lower ends in a projecting part or small pins 71 or 72, acted upon by the frame 17. The one, 71, is directly in contact with the frame; the other, 72, is connected to it by a stirrup piece, so that the position of the first is only modified by a thrust of the frame and the second by a pull. These pins constitute thus elastic abutments, owing to the springs 62 and 64 of the clutches, and their displacement only occurs when the thrust or pull of the frame is sufficient to overcome the resistance of the springs.

As in the torpedo previously described, the conducting electric leads are wound on two insulated bobbins mounted on the shaft 73 which connects the two cutting plates 3. These leads are unwound, are embedded in the earth as the torpedo advances, and emerge at the rear part of it.

The action of the torpedo in this modification is as follows:—The torpedo being placed in the entrance of a gallery dug in the soil, and turned in the required direction, and the vertical direction being ensured by the setting of the slide block 37 relatively to the graduations of the sector 38, according to the required inclination with the horizontal, the electric circuit is energized.

The motor is set in motion driving the shaft 26 which communicates its motion, by the clutches 58, 61 and 63, 65 when in gear to the upper chain 60 which drives the evacuating members 6 and the excavating members 2, and also to the lower chain 20, which drives the propelling members 19. The shaft 26 is continuously rotated by the toothed wheels 74 and 75, and the bevel pinions 76 and 10 drive the plate 8.

The torpedo is set in movement and the material broken up in front by the chain 2 is received by the chain 6 which rapidly conducts it to the rear, where it falls into the space included between the cones 9, the back of the heaped up earth, and the rotary plate 8.

By their combined movement the cones heap the disintegrated material as it arrives against the back of the earth already piled.

During the work of excavating, evacuating and piling, the torpedo, moved by the propelling chain 19, progresses, maintaining thus a suitable contact between the working front and the knives of the excavating chain 2.

The frame 17 is united to the torpedo by the rods 16 which enable it to be displaced relatively to the body of the latter. Also, the pins 71 and 72, which are the only points of contact between the body of the torpedo and the frame, are arranged relatively to this frame, so as only to have their position modified, 71 by the thrust, 72 by the pull, of this frame, when this thrust or pull attain a certain predetermined value, and also the pin 72 constitutes the connection which permits the body of the torpedo to be drawn by the frame.

In the course of the advance, different cases may occur.

1st, more excavated material may arrive at the rear of the torpedo than the piling means can deal with effectually. The cones 9, under the reaction of the excess earth, tend to displace the body of the torpedo towards the front more rapidly than the propelling chain 19. The back of the torpedo approaches the rear side of the frame 17 which displaces the pin 71 and consequently the fork 67 overcoming the spring 62, and the cone 61 is unclutched. This unclutching immediately determines the stopping of the evacuating chain 6, of the excavating chain 2 and the propelling chain 19.

During the time of stoppage, the rotary back plate 8 continues its work of piling while still subject to the action of spring 62, which tends to return it to its original position. As soon as the volume of the earth is suitably reduced, the spring 62 again causes the engagement of the shafts 26 and 57 and the machine resumes its progress.

2nd, it may happen that the torpedo encounters a particularly hard soil. The excavating chain 2, on account of the resistance which it meets in forming the passage for the torpedo, causes a delay in the advance of the latter relatively to the propelling chain 19. The rear of the torpedo and the rear side of the frame 17 are separated, which displaces the pin 72 and consequently the fork 68, compressing the spring 64 and causing the disengagement of the cone 63 and the stoppage of the propelling chain 19.

During the stoppage, the excavating chain 2, the evacuating chain 6 and the rotary disc 8 continue to act. When the excavating chain 2 has, under the pressure of spring 64, sufficiently broken up the soil, this spring again causes the engagement of the clutch 63 and the propelling chain resumes its motion.

3rd, the machine moving in the soil, more or less rapidly, according to the nature of the latter, may also be deviated from the required vertical inclination in depth. The action of the pendulum corrects such possible deviations which might modify the desired effect due to the explosion of the torpedo.

For example, if the machine tends to descend relatively to the required inclination, the pendulum 34 preserves automatically its vertical position and engages with the platinized screw 40 on the slide block 47 which was set in a suitable position at starting.

Electric contact being thus established, current traverses the electromagnet 44 which attracts the corresponding end of the lever 53, rotates the member 47, drawing with it the pinion 48 and bringing it into engagement with the pinion 49. The pinion 51, participating in the rotation of the pinion 48, actuates the longitudinal shaft 33 by means of the pinion 52, which is keyed on it.

The worm 32 keyed at the end of this shaft 33 turns by means of the worm wheel 31 the shaft 30 and consequently the pins 29 which are placed at its ends. The pins 29 serving as pivots to the forward rods 16 turn then in a direction suitable for producing a displacement of the frame 17 and the body of the torpedo, which will thus reestablish the required inclination. When this result is obtained, the pendulum loses contact with the platinized screw 40, the current ceases to pass, and the sleeve 47 is brought into its mean position by the spring mentioned above.

The stabilizing system remains constant until a new action of the pendulum modifies it in the same direction as before, or in the other direction, according to the relative positions of the body of the torpedo and of the frame.

In the contrary case to that which has been considered by way of example, the action of the pendulum produces a contrary rotation of the shaft 33 by the engagement of the pinion 48 with the pinion 50 which determines the approach of the frame and of the body of the torpedo.

Finally, the course of the torpedo and the explosion are determined as in the first arrangement, respectively, by the length of one of the conducting leads wound on the bobbins, and the passage of a current in the second, which is a little longer, after the first has been broken.

While the specific embodiment chosen as the basis of this application is an underground torpedo, and such use constitutes one of the most important applications of the invention, yet it is to be understood that certain features thereof will find important utilities in other instances where it is desired to propel a machine or engine underground, as for accomplishing excavation, or for analogous purposes.

Having thus described the nature of the said invention and the best means we know of carrying the same into practical effect, we claim:—

1. A subterranean automobile engine comprising a motor carried by the engine, an external source of electric energy, a lead connecting the motor with the said source, an endless chain provided with links having cutting blades for excavating the soil, an endless chain for advancing the engine and an endless chain for transporting the excavated material to the rear of the engine.

2. A subterranean automobile engine comprising a motor carried by the engine, an external source of electric energy, a lead connecting the motor with the said source, an endless chain provided with links having cutting blades, and side circular plates at the front end of the engine also provided with cutting blades and means operated by the said motor for driving the said endless chain and circular plates to excavate the soil.

3. In a subterranean automobile engine, a frame carrying an endless chain with teeth adapted to penetrate the soil and advance the machine, an endless chain with cutting blades to excavate the soil and an endless chain to transport the excavated material to the rear, the said frame being connected to the body of the engine by pivoted rods.

4. In a subterranean automobile engine, a motor supplied with energy from an external source, a frame connected to the body of the engine by pivoted rods and carried by the said frame, an endless chain provided with cutting blades for excavating the soil, an endless chain for transporting the excavated material and cones at the rear of the engine, both chains being driven by the said motor.

5. In a subterranean automobile engine, a motor supplied with energy from an external source, an endless chain with cutting blades for excavating the soil, an endless chain for transporting the excavated material to the rear, a circular plate rotated about a fixed axis at right angles to its plane by the said motor, and cones rotated about the same axis by the said plate and adapted to receive the excavated material and deposit it at the rear of the engine.

6. In a subterranean automobile engine, a motor supplied with energy from an external source, an endless chain with cutting blades for excavating the soil, an endless chain for transporting the excavated material to the rear, a circular plate rotated about a fixed axis at right angles to its plane by the said motor, and cones rotated about the same axis by the said plate, a bevel wheel secured to the fixed axis of the plate and pinions on the spindles of the hollow cones gearing with the said bevel wheel.

7. A subterranean automobile engine, comprising a motor carried by the engine, a source of electric energy external to the engine, leads connecting the source with the motor, a shaft continuously driven by the motor, endless chains for excavating and transporting the soil and means for communicating the motion of the shaft to the said chains through a clutch urged into engagement by spring pressure.

8. A subterranean automobile engine comprising a motor carried by the engine, a source of electric energy external to the engine, leads connecting the source with the motor, a shaft continuously driven by the motor, endless chains for excavating and transporting the soil carried on a frame connected to the body of the engine by pivoted rods, means for communicating the motion of the shaft to the said chains through a clutch urged into engagement by spring pressure and means by which the clutch is brought out of engagement when the frame advances less rapidly than the body of the engine.

9. A subterranean automobile engine comprising a motor carried by the engine, a source of electric energy external to the engine, leads connecting the source with the motor, a shaft continuously driven by the motor, endless chains for excavating and transporting the soil carried on a frame connected to the body of the engine by pivoted rods, means for communicating the motion of the shaft to the said chains through a clutch urged into engagement by spring pressure, a shaft disposed near the rear end of the engine, a fork engaging with the clutch, a pin carried by an arm on the shaft and adapted to actuate the said fork to bring the clutch out of engagement, when the frame advances less rapidly than the body of the engine.

10. A subterranean automobile engine comprising a motor carried by the engine, a source of electric energy external to the engine, leads connecting the source with the motor, a shaft continuously driven by the motor, an endless chain with teeth penetrating the soil and adapted to advance the machine, and means for communicating the motion of the shaft to the said chain through a clutch urged into engagement by spring pressure.

11. A subterranean automobile engine comprising a motor carried by the engine, a source of electric energy external to the engine, leads connecting the source with the motor, a shaft continuously driven by the motor, an endless chain with teeth penetrating the soil and adapted to advance the machine, means for communicating the motion of the shaft to the said chain through a clutch urged into engagement by spring pressure, and means by which the clutch is brought out of engagement when the propelling chain advances more rapidly than the body of the engine.

12. A subterranean automobile engine comprising a motor carried by the engine, a source of electric energy external to the engine, leads connecting the source with the motor, a shaft continuously driven by the motor, endless chains for excavating and transporting the soil carried on a frame connected to the body of the engine by pivoted rods, means for communicating the motion of the shaft to the said chains through a clutch urged into engagement by spring pressure, a shaft disposed near the rear end of the engine, a fork engaging with the clutch, a pin carried by an arm on the shaft and adapted to actuate the said fork to bring the clutch out of engagement, when the frame advances more rapidly than the body of the engine.

In witness whereof, we have hereunto signed our names in the presence of two subscribing witnesses.

HENRI BRETON.
RENÉ BRETON.

Witnesses:
CHAS. P. PRESSLY,
HENRI CARTIER.